United States Patent [19]

Davis

[11] Patent Number: 5,450,509
[45] Date of Patent: Sep. 12, 1995

[54] FIBER OPTIC ROTARY JOINT

[75] Inventor: Carol A. Davis, Los Angeles, Calif.

[73] Assignee: AlliedSignal Inc., Morristown, N.J.

[21] Appl. No.: 280,861

[22] Filed: Jul. 26, 1994

[51] Int. Cl.6 ............................ G02B 6/26; G02B 6/28
[52] U.S. Cl. .......................... 385/26; 385/24; 385/25; 385/27; 385/32; 385/114
[58] Field of Search .................. 385/24, 25, 26, 27, 385/31, 30, 32, 114, 147, 134

[56] References Cited

U.S. PATENT DOCUMENTS

| | | | |
|---|---|---|---|
| 4,277,134 | 7/1981 | Upton, Jr. | 385/26 X |
| 4,444,459 | 4/1984 | Woodwell | 385/26 X |
| 4,525,025 | 6/1985 | Hohmann et al. | 385/26 X |
| 4,749,249 | 6/1988 | Hockaday et al. | 385/26 X |
| 4,978,191 | 12/1990 | Hasegawa et al. | 385/26 X |
| 5,078,466 | 1/1992 | MacCulloch | 385/26 |
| 5,210,378 | 5/1993 | Tusques | 385/114 X |

Primary Examiner—Brian Healy
Attorney, Agent, or Firm—John R. Rafter

[57] ABSTRACT

An improved fiber optic rotary joint is provided for connecting optical fibers across a rotary-stationary interface. The rotary joint comprises a rotary hub mounted within a stationary housing which defines a cylindrical outer rim, in combination with a fiber optic tape connected between the hub and rim and adapted for respective connection at said hub and rim to a pair of fiber optic cables. The tape is coiled about the hub and extends therefrom with a reverse bend for coiling within the outer rim, whereby the tape unwraps from the hub for wrapping within the outer rim, and vice versa, in accordance with the direction of hub rotation. A tape guide unit includes rollers for maintaining the reverse bend as the tape is transferred between the inner hub and the outer rim.

17 Claims, 6 Drawing Sheets

FIBER OPTIC ROTARY JOINT

BACKGROUND OF THE INVENTION

This invention relates generally to rotary joints or connectors for passing information and/or power signals across a rotary-stationary interface, particularly such as passing optical signals through a plurality of optical fibers. More specifically, this invention relates to an improved rotary joint of the fiber optic type, wherein the rotary joint is designed to provide a relatively large finite turn capacity in a compact joint structure.

Fiber optic technology has undergone significant expansion in recent years, particularly for use in conveying communication data, voice data, and other information. In some applications, however, it is necessary to connect optical fibers across a rotary-stationary interface so that optical signals can be transmitted without interruption between rotating and stationary frames of reference.

In many rotary joint applications for fiber optic systems, infinite rotary turn capacity is not required. Instead, the rotary joint can be designed to accommodate a finite number of turns. One such rotary joint having a finite turn capacity is shown and described in U.S. Pat. No. 5,078,466, wherein an elongated fiber optic tape is coiled within a cylindrical housing with opposite ends of the tape connected respectively to a pair of fiber optic cables at a rotary inner hub and a stationary outer rim on the housing. The fiber optic tape thus provides an optical link for uninterrupted passage of optical signals between said cables. The length of the tape coiled within the housing is chosen to accommodate a selected finite number of turns as the rotary hub is driven in opposite directions. This rotary joint is useful, for example, in an application wherein a plurality of sensors are mounted along the length of a cable stored on a rotatable drum, and sensor signals are carried by optical fibers from the sensors to a stationary monitor. The sensor cable is rotated in opposite directions through a finite number of turns to reel the sensor cable in and out, with the rotary joint providing for uninterrupted passage of optical signals across the rotary-stationary interface defined by the rotating drum and the stationary monitor.

While the fiber optic rotary joint of the U.S. Pat. No. 5,078,466 functions beneficially in certain finite turn count applications, practical considerations effectively limit the turn count capacity to a relatively small number. That is, the fiber optic tape is spirally coiled within the housing in the configuration of a watch mainspring, and the tape is designed with a length and stiffness to accommodate a desired turn count without tape buckling or excess friction as adjacent tape coils slide over one another. Attempts to increase turn count capacity have required significant and undesirable increases in tape length and stiffness, as well as increases in the diametric size of the rotary joint.

The present invention pertains to an improved fiber optic rotary joint of the general type described in U.S. Pat. No. 5,078,466, wherein the turn count capacity is significantly increased and/or the diametric size of the rotary joint structure is significantly decreased, and further wherein tape buckling and friction problems are substantially eliminated.

SUMMARY OF THE INVENTION

In accordance with the invention, an improved rotary joint is provided for uninterrupted passage of information signals and the like, particularly such as fiber optic signals, across a rotary-stationary interface. The rotary joint comprises an elongated fiber optic tape coiled between an inner rotary hub and a cylindrical outer rim of a stationary housing, wherein the fiber optic tape is adapted for respective connection at said inner hub and outer rim to a pair of fiber optic cables. The tape is coiled about the hub and within the rim, and extends with a reverse bend therebetween. The tape is unwrapped from the hub for wrapping within the rim, and vice versa, in accordance with the direction of hub rotation. With this construction, including the reverse bend, the resultant fiber optic rotary joint has a relatively high turn count capacity in a compact structure.

In accordance with the preferred form of the invention, a tape guide unit is provided for maintaining the reverse bend in the fiber optic tape during hub rotation to transfer tape back and forth between the inner hub and outer rim so that a relatively lightweight and highly flexible tape can be used. Moreover, adjacent tape coils are not required to slide over one another so that tape buckling problems attributable to sliding friction are substantially eliminated. The tape guide unit ensures that the tape is wrapped tightly, substantially without slack, on the hub and within the rim. The tape guide unit includes intermittent drive means responsive to tape tension force applied to the reverse bend as the tape is transferred between the hub and rim, thereby compensating for varying diametric sizes of the tape coils on the hub and rim.

In accordance with a primary aspect of the invention, the reverse bend configuration of the fiber optic tape extending between the inner hub and outer rim provides the rotary joint with a significantly increased turn count capacity, for a given tape length, in comparison with the rotary joint of U.S. Pat. No. 5,078,466. That is, with the reverse bend, the contact point of tape wrapping and unwrapping relative to the hub travels or orbits in a direction common to the direction of hub rotation. Thus, for each full revolution of the rotary hub, the length of fiber optic tape unwrapped from or wrapped onto the hub, in accordance with the direction of hub rotation, is less than the circumference of the outermost tape coil on the hub during that revolution. By contrast, in the rotary joint of U.S. Pat. No. 5,078,466, the contact point of tape wrapping and unwrapping travels in a direction opposite to hub rotation, such that a length of tape greater than the coil circumference is displaced for each full revolution of the hub. Accordingly, in the present invention, a significantly increased number of hub turns can be accommodated with a significantly reduced length of fiber optic tape.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
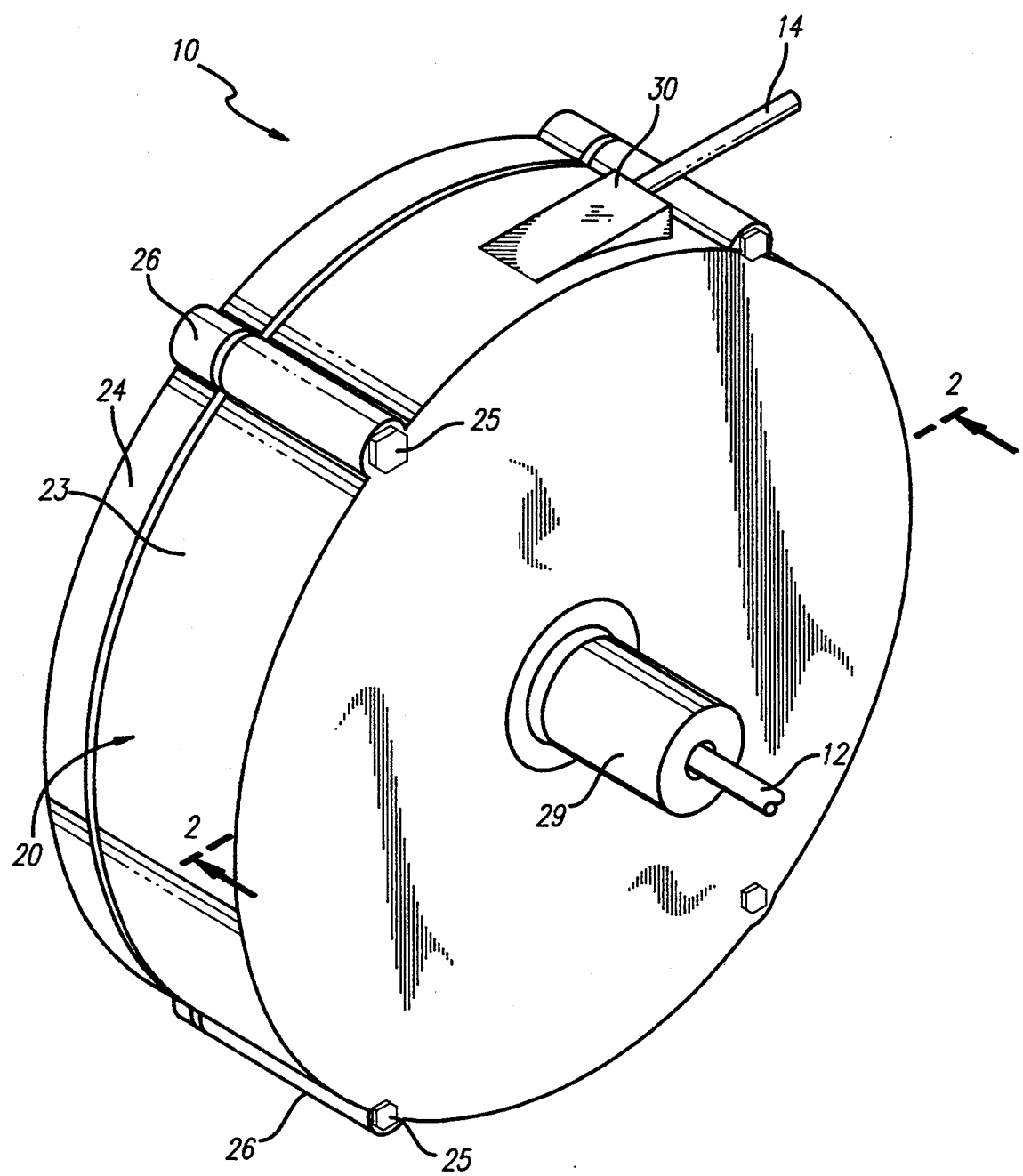
FIG. 1 is a fragmented perspective view illustrating an improved fiber optic rotary joint embodying the novel features of the invention.

As shown in the exemplary drawings, an improved fiber optic rotary joint referred to generally in FIG. 1 by the reference numeral 10 is provided for connecting information signals across a rotary-stationary interface. The rotary joint 10 is particularly designed for use in a fiber optic system to transmit optical signals across the rotary-stationary interface between a pair of fiber optic cables 12 and 14. The rotary joint 10 includes an elongated fiber optic tape 16 (FIG. 2) connected between the cables 12 and 14 to provide uninterrupted transmission of optical signals. The fiber optic tape 16 has a reverse bend formed therein, as indicated by arrow 18, wherein this reverse bend 18 enables the rotary joint 10 to accommodate a relatively large finite number of turns in a compact joint structure.

The fiber optic rotary joint 10 of the present invention constitutes an improvement upon the fiber optic rotary joint shown and described in commonly assigned U.S. Pat. No. 5,078,466, which is incorporated by reference herein. In this regard, as viewed generally in FIGS. 1 and 2, the rotary joint 10 comprises a stationary housing 20 formed by spaced-apart and generally planar front and rear walls which define a housing cavity or chamber bounded by a generally cylindrical outer rim 22. As depicted in FIG. 1, the housing 20 may be constructed as a pair of generally shell-shaped housing halves 23 and 24 adapted for assembly in face-to-face relation as by means of bolts 25 fastened through bosses 26 on the perimeter of the housing halves. A rotary hub 28 (FIG. 2) is coaxially mounted within the housing 20 for bidirectional rotation therein in response to rotational driving of a drive shaft or the like (not shown). The fiber optic cable 12 at the rotating side of the interface extends into the housing 20 via a bearing member 29 or the like for appropriate connection at the hub 28 to one end of the fiber optic tape 16. In this regard, the cable 12 includes a plurality of discrete optical fibers for one-to-one connection at the hub 28 to respective optical fibers laminated within the fiber optic tape 16. One preferred connection geometry for this connection and a related tape configuration are disclosed in U.S. Pat. No. 5,078,466.

The fiber optic tape 16 is coiled in a spiral fashion about the rotary hub 28 in a plurality of relatively tight, substantially slack-free coils or wraps. The tape 16 transitions through the reverse bend 18 to a corresponding plurality of tape coils or wraps within the outer rim 22. In this regard, the tape 16 is desirably constructed from a lightweight and flexible material such as laminated Mylar or Kapton tape having sufficient stiffness for substantially slack-free wrapping in coils onto the inner hub 28 and within the outer rim 22. The outer end of the fiber optic tape 16 is connected in turn by a suitable connector 30 to the fiber optic cable 14 on the stationary side of the interface. Once again, the individual fibers of the tape 16 are connected one-to-one with individual fibers of the cable 14, with one suitable connection technique being described in U.S. Pat. No. 5,078,466.

The fiber optic tape 16 thus provides an unbroken optical communication link between the cables 12 and 14, as the hub 28 is rotatably driven in either direction. Hub rotation in a first direction (FIG. 4) causes the fiber optic tape 16 to unwrap from the inner hub and to wrap within the outer rim 22. Conversely, rotation of the hub 28 in an opposite or second direction (FIG. 6) causes the tape 16 to unwrap from the outer rim 22 and to wrap onto the inner hub 28. The maximum number of turns in either direction is finite, in accordance with the overall length of the fiber optic tape 16 and the diametric size of the housing 20. The reverse bend 18 provides the improved rotary joint 10 with a significantly increased turn count capacity and/or permits the joint to have a significantly overall small size and shorter tape length, in comparison with a unidirectionally coiled fiber optic tape as described in U.S. Pat. No. 5,078,466. A tape guide unit 32 is provided to maintain the reverse bend 18 in the fiber optic tape 16, and to ensure substantially slack-free wrapping and unwrapping as the tape 16 transitions between the inner hub and the outer rim.

Figure 2:
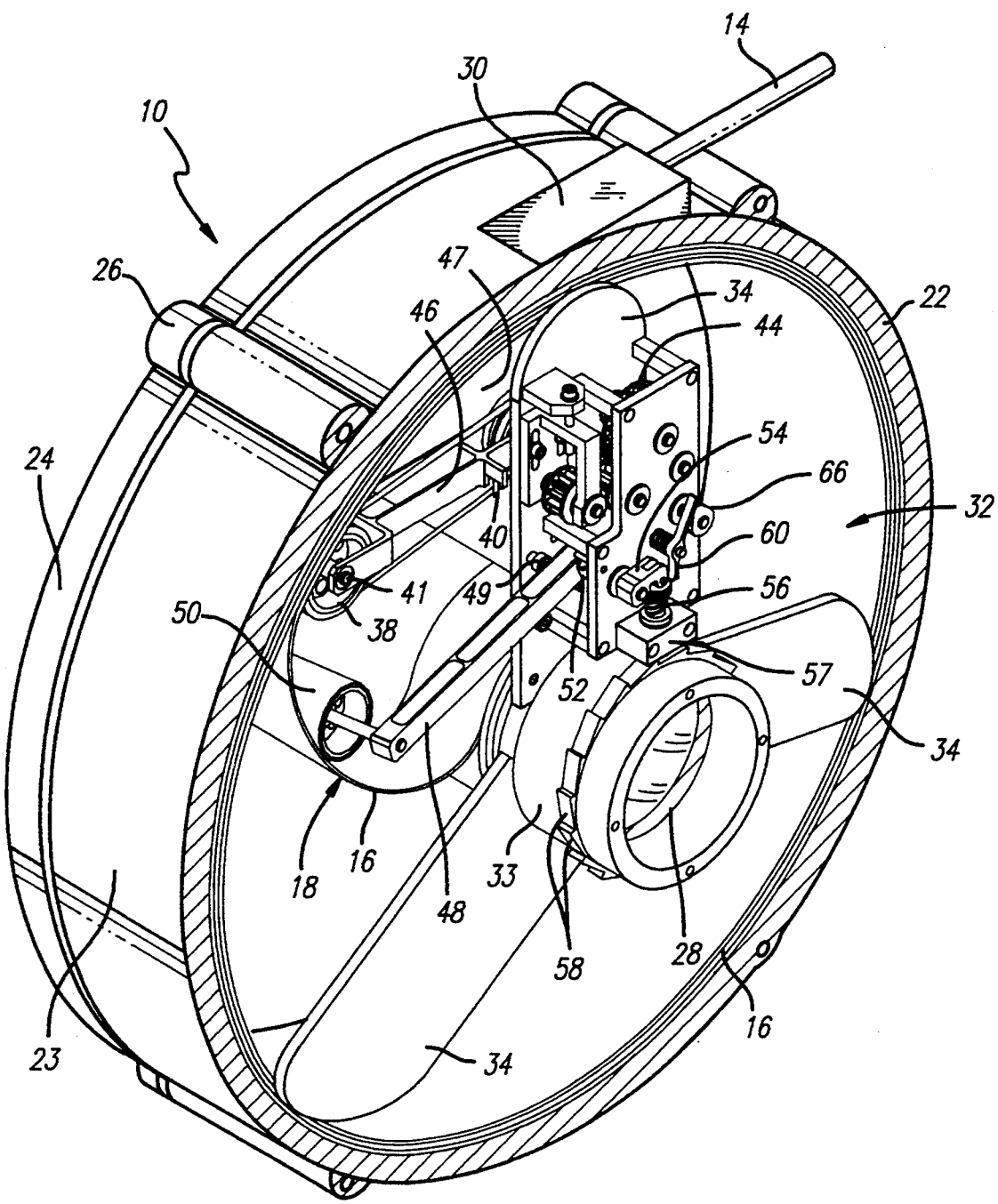
FIG. 2 is a sectional view taken generally on the line 2—2 of FIG. 1.
Figure 3:
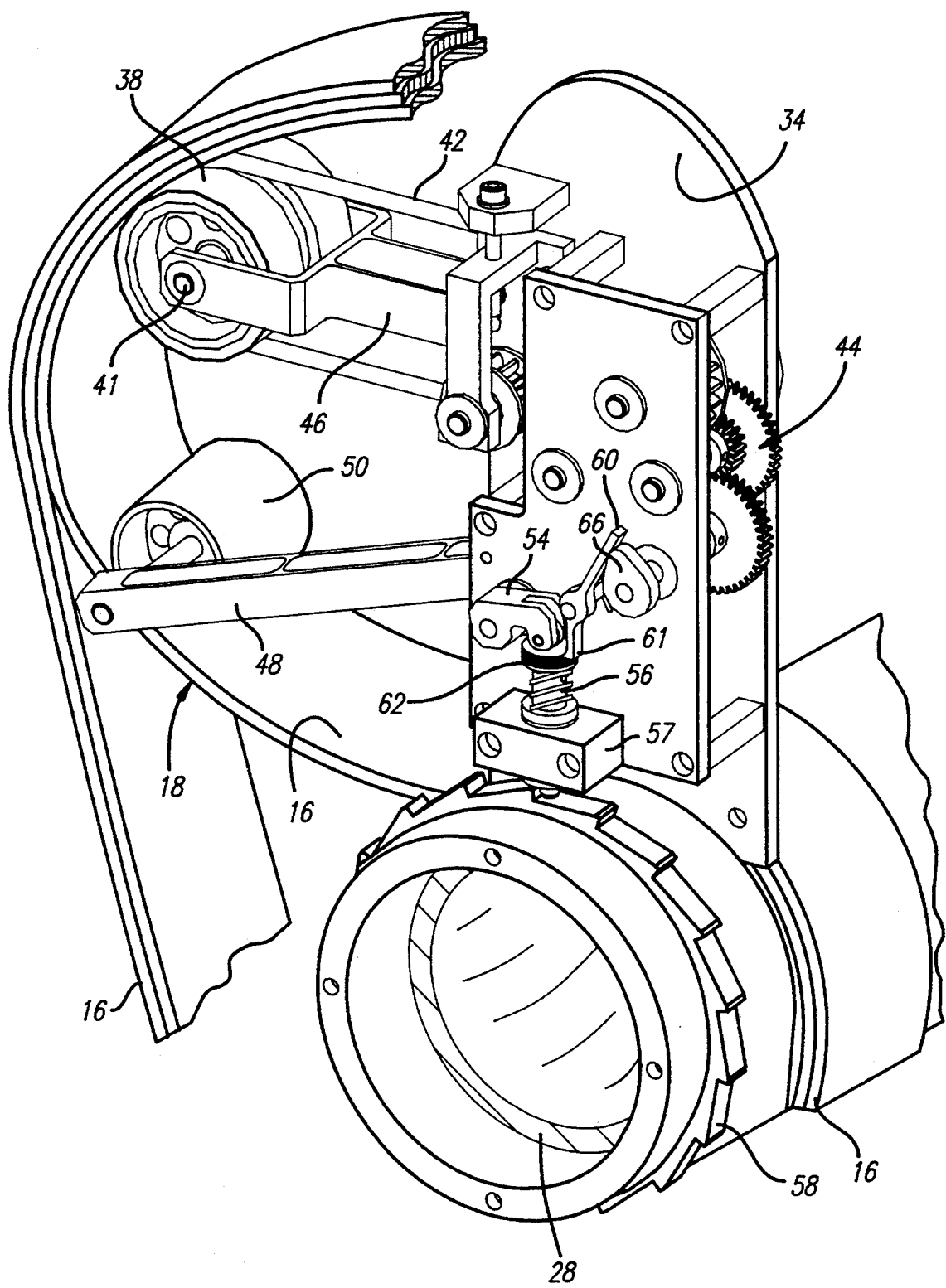
FIG. 3 is an enlarged fragmented perspective view illustrating a tape guide unit for forming and maintaining a reverse bend in a fiber optic tape extending between inner and outer tape coils.
Figure 4:
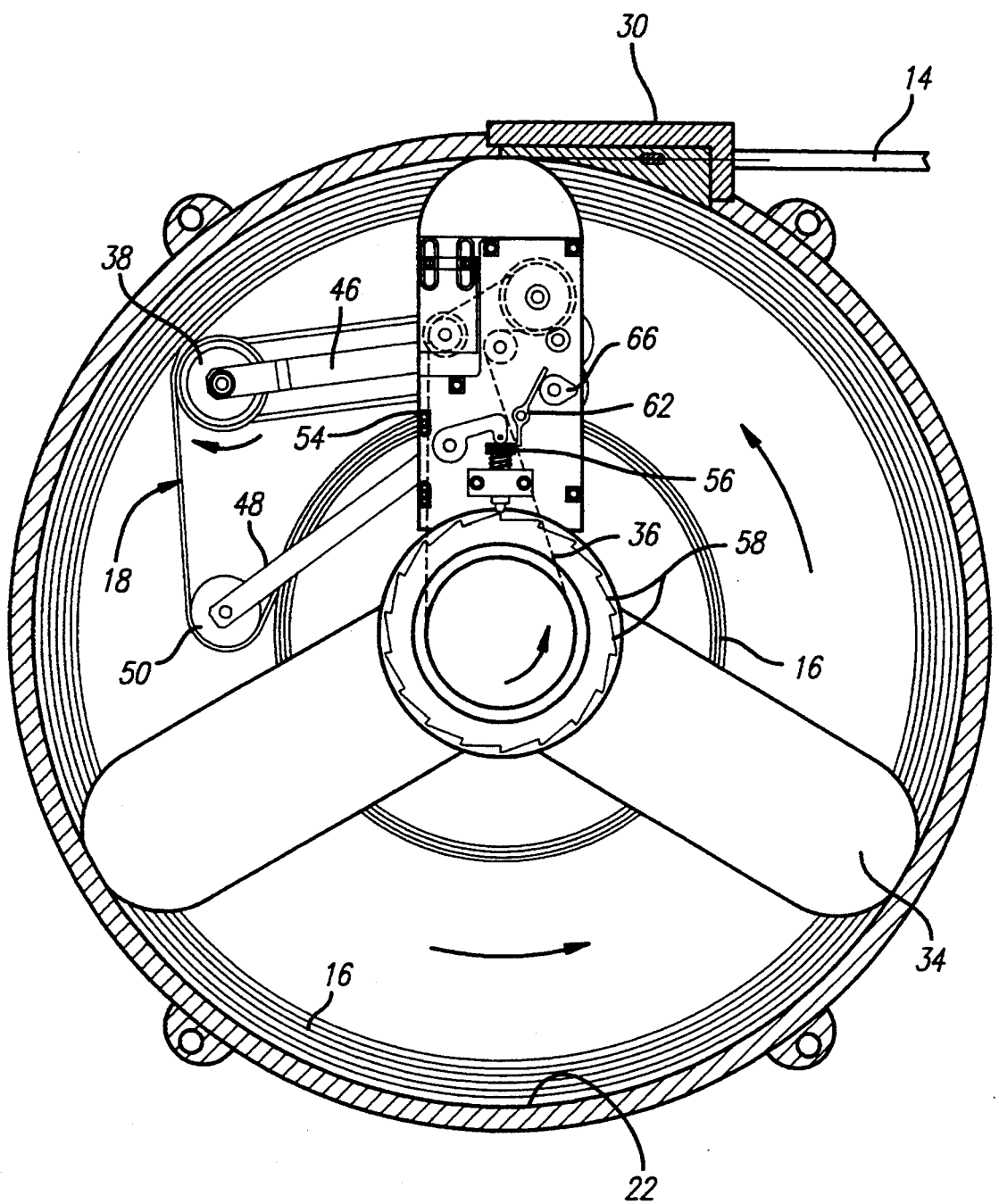
FIG. 4 is an elevational view similar to FIG. 2, and illustrating rotation of a rotary hub in a first direction.

More specifically, as shown best in FIGS. 2–4, the tape guide unit 32 includes a support ring 33 having a plurality of bladelike or paddle-shaped arms 34 radiating outwardly therefrom. The support ring 33 is mounted on the rotary hub 28 to permit free rotation of the arms 34 relative to the hub. The illustrative drawings show three of the arms 34 disposed coaxially at one side of the fiber optic tape 16 coiled on the hub 28.

One of the arms 34 of the tape guide unit 32 comprises a carrier arm having a pivot link 46 extending laterally therefrom with a guide roller 38 at a distal end thereof. A spring 40 (FIG. 2) biases the pivot link 46 in a direction carrying the guide roller 38 toward engagement with the tape coil within the outer rim 22. The guide roller 38 includes a drive spindle 41 (FIG. 3) having a one-way clutch to permit free-wheel rotation of the guide roller 38 in one direction, and positive drive of the guide roller in the opposite direction. A drive belt 36 (FIG. 4) on the rotary hub 28 operates a reduction gear train 44 and a pulley belt 42 to drive the guide roller 38 in said opposite direction when the hub 28 is driven counter clockwise as viewed in FIGS. 2–5. Note that the guide roller 38 in this instance is driven in a direction opposite to the direction of hub rotation. Conversely, when the rotary hub 28 is driven in a clockwise direction as viewed in FIG. 6, the guide roller 38 is not positively driven by virtue of the one-way clutch incorporated into the spindle 41. Alternately, if desired, the one-way clutch may be incorporated into other elements of the drive mechanism, such as a pulley wheel 47 (FIG. 2) at the output side of the gear train 44.

The carrier arm 34 of the tape unit 32 also carries a laterally projecting tension arm 48 which projects outwardly from the arm 34 at a radial position generally mid-way between the hub 28 and pivot link 46. A tension roller 50 is carried for free-wheel rotation at the outboard or distal end of the tension arm 48, and a biasing spring 52 (FIG. 2) urges the tension arm 48 to pivot away from the pivot link 46 and its associated guide roller 38. The relative strength of tension spring 52 is significantly less than the biasing force applied to the pivot link 46 by the spring 40, so that tension applied to the segment of the fiber optic tape 16 constituting the reverse bend 18 will cause the tension roller 50 to be drawn toward the guide roller 38, as viewed in FIGS. 4 and 5, without pulling the guide roller 38 away from contact with the tape coiled within the outer rim 22. Stops 49 (FIG. 2) on the carrier arm engage the tension arm 48 to define end limits of pivoting movement of the tension arm.

Figure 5:
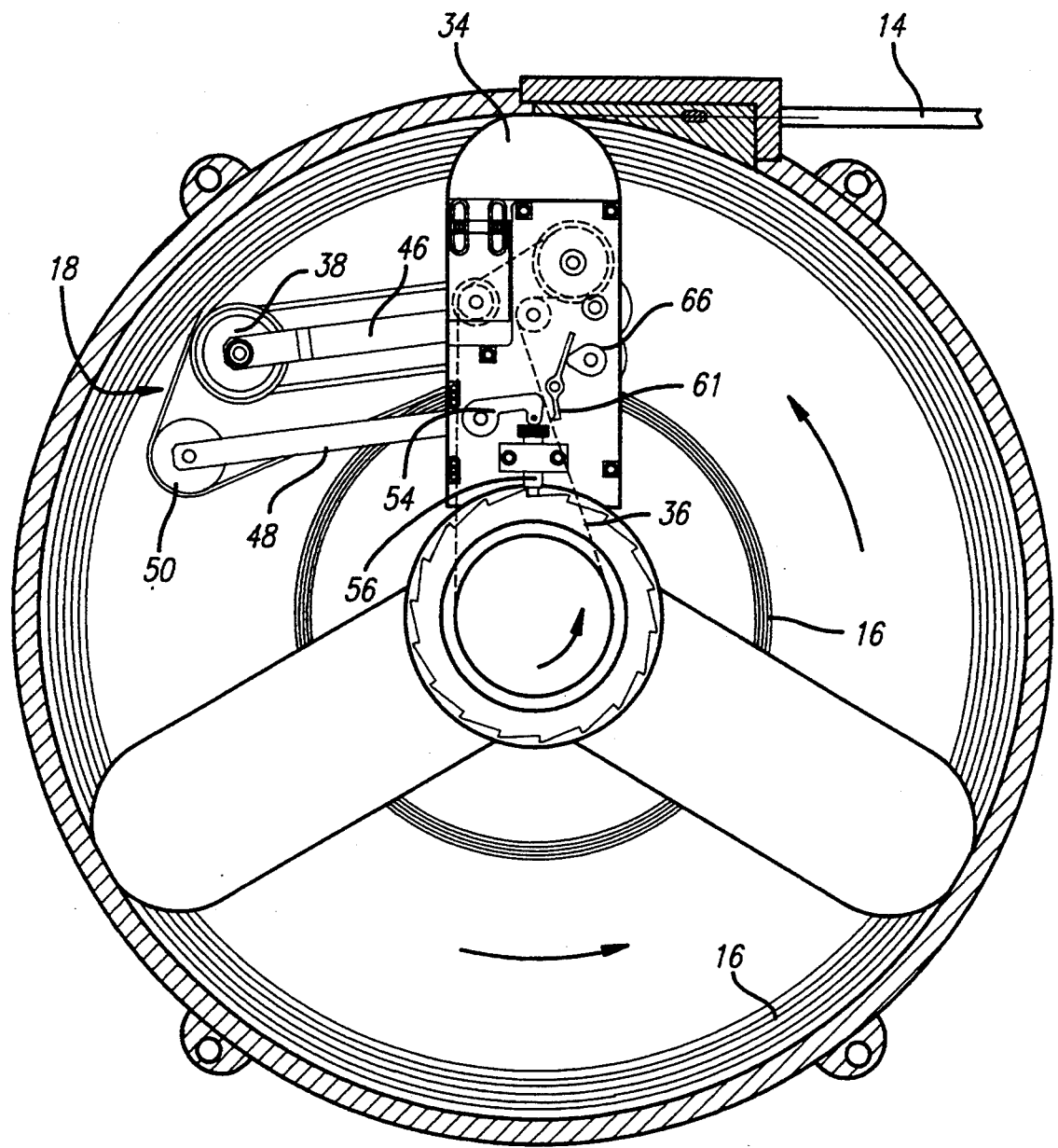
FIG. 5 is an elevational view similar to FIG. 5, and depicting operation of the tape guide unit to relieve tape tension, upon rotation of the hub in the first direction.

As the hub 28 is rotated in a first direction, counter clockwise as viewed in FIGS. 4 and 5, to unwrap the tape 16 from the hub 28 and to wrap the tape 16 within the outer rim 22, the guide roller 38 is rotatably driven from the hub 28 to guide tape 16 unwrapping from the hub coil for smooth and substantially slack-free wrapping within the rim coil. In this regard, as shown best in FIGS. 3-5, the guide roller 38 contacts the rim coil at a point of contact where the reverse bend 18 transitions to the outer coil. As hub rotation proceeds, this point of contact revolves in an orbital fashion about the axis of the rotary hub 28. That is, the rotatably driven guide roller 38 engages the outer coil with a rolling point of contact which revolves about the hub axis, whereby the entire tape guide unit 32 revolves about the hub axis.

In the preferred design, the rotational speed of the guide roller 38 is designed for slight overtravel with respect to the linear speed of tape transfer from the hub 28 to the outer rim 22. This slight overtravel of the guide roller 38 insures that the tape 16 is snugly coiled within the outer rim 22. In this regard, the tape 16 is designed with sufficient stiffness to wrap snugly in coils within the rim 22, as the guide roller 38 travels orbitally about the hub. However, the overtravel feature causes the tape 16 to be wrapped within the rim 22 faster than it is unwrapped from the hub 28, so that the length of the tape comprising the reverse bend 18 is progressively shortened. As this occurs, the tension roller 50 is slowly drawn toward the guide roller 38, as viewed in FIG. 5, with a corresponding increase in tape tension as the tension roller is drawn against the spring 52.

When a predetermined limit position is reached, a cam link 54 at the inboard end of the tension arm 48 is displaced sufficiently to press a spring-loaded stop pin 56 through a bearing block 57 in a radially inward direction toward a ring of ratchet teeth 58 mounted in a stationary or fixed position on the housing 20. The stop pin 56 is thus moved to a position engaging one of the ratchet teeth 58, thereby temporarily halting rotation of the tape guide unit 32 and the guide arms 34. Rotary movement of the hub 28, however, continues to correspondingly continue unwrapping movement of the tape 16 from the hub 28. This unwrapping motion increases the length of the tape 16 forming the reverse bend 18, thus relieving the tension thereon, and enabling spring-loaded return of the tension arm 48 in a direction away from the guide roller 38. Such return motion of the tension arm 48 is accompanied by displacement of the cam link 54 from the stop pin 56. However, a latch pawl 60 on the carrier arm is spring-loaded to engage a pawl foot 61 with serrated ribs 62 on the stop pin 56 to retain the stop pin in engagement with the ratchet ring 58. Retention of the stop pin in this position allows sufficient slack to the build up within the reverse bend, so that the tension arm can return fully to its original position. The stop pin 56 is subsequently retracted from the ratchet teeth 58 by means of an orbital cam 66 driven by the gear train 44, wherein the cam 66 pivots the latch pawl 60 to retract the foot 61 sufficiently to permit spring-loaded stop pin retraction from the ratchet teeth 58.

Figure 6:
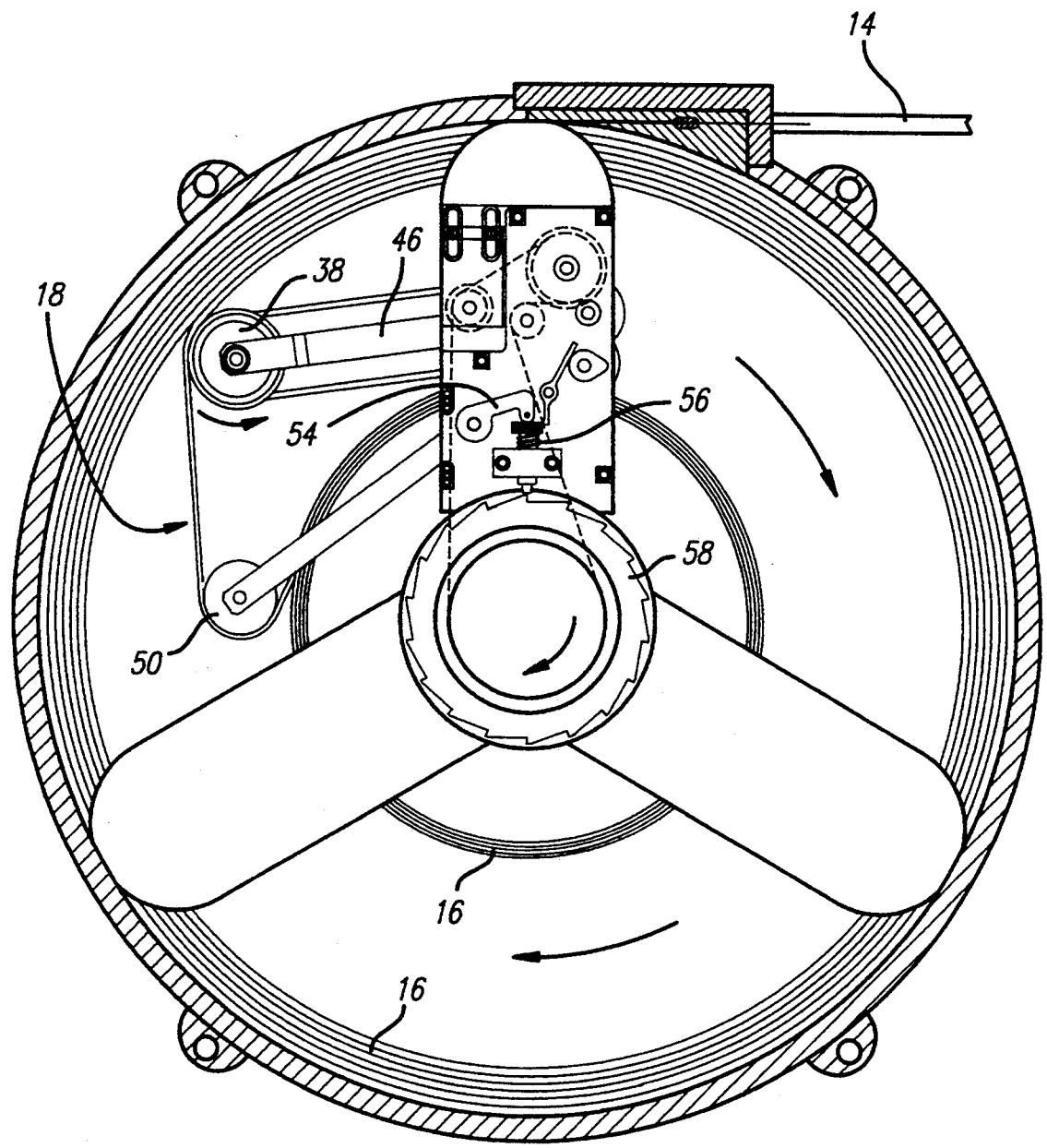
FIG. 6 is an elevational view depicting operation of the tape guide unit in response to hub rotation in a second, opposite direction.

When the rotary hub 28 is driven in an opposite direction, clockwise as viewed in FIG. 6, the fiber optic tape 16 is unwrapped from the outer rim 22 and coiled onto the inner rotary hub 28. In this direction of rotation, the guide roller 38 is again biased by the spring 40 into rolling contact with the tape coiled within the rim 22, but the one-way clutch incorporated in the guide roller 38 prevents positive driving motion. Instead, the rotation of the inner hub 28 pulls the tape over the tension roller 50 and the guide roller 38 as the tape thus transitions smoothly from the outer rim and through the reverse bend 18 for substantially slack-free coiling onto the hub 28. As this motion proceeds, the guide roller 38 maintains the point contact with the tape at the juncture between the outer coil and the reverse bend, with the result that the guide roller 38 is pulled by the tape 16 orbitally about the axis of the hub 28. Accordingly, the tape guide unit 32 is pulled through a rotational motion by the tape. The pulling action assures snug tape wraps or coils on the hub 28, irrespective of varying diametric sizes of the inner and outer coils.

In accordance with a primary aspect of the invention, the reverse bend 18 permits the rotary joint 10 to have a relatively high turn count capacity in a compact structure. In this regard, for either direction of hub rotation, the contact point for wrapping or unwrapping of the tape 16 relative to the rotary hub 28 revolves about the hub in a direction common to hub rotation. Thus, for any single full revolution of the hub 28, the length of the tape 16 actually displaced is equal to the circumference of the outermost coil on the hub less the distance of movement of the contact point. Accordingly, for any single revolution of the hub, a length of tape which is less than the coil circumference is displaced. By contrast, when the reverse bend 18 is not used as exemplified by the fiber optic joint of U.S. Pat. No. 5,078,466, the contact point revolves in a direction opposite to hub rotation such that the length of tape displaced for a single hub revolution exceeds the coil circumference. In the present invention, the reverse bend thus enables the joint to accommodate a significantly increased turn count, without increasing the length of the fiber optic tape 16, and/or without increasing the diametric size of the housing 20. Alternatively, the present invention permits a turn count comparable to a rotary joint of the type described in U.S. Pat. No. 5,078,466, but with a significantly shorter tape length and/or smaller housing size.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. A rotary joint, comprising:
   a housing defining a chamber bounded by a generally annular rim;
   a hub within said housing, said hub and housing being adapted for rotation one relative to the other;
   an elongated flexible tape member extending between said hub and said rim, said tape for transmitting optic signals member being coiled about said hub to define a hub coil and said tape member being coiled within said rim to define a rim coil, said tape member extending with a reverse bend between said hub coil and said rim coil; and a tape guide unit for maintaining said reverse bend in said tape member upon rotation of said hub and housing relative to each other to transfer said tape member between said hub coil and said rim coil.

2. The rotary joint of claim 1 wherein said tape member comprises a fiber optic tape.

3. The rotary joint of claim 2 further including a first fiber optic cable connected to said tape at said hub, and a second fiber optic cable connected to said tape at said rim.

4. The rotary joint of claim 1 wherein said tape guide unit includes a guide roller in rolling contact with said tape member to maintain said reverse bend.

5. The rotary joint of claim 4 wherein said guide roller is in rolling contact with said tape member at the juncture between said reverse bend and said rim coil.

6. The rotary joint of claim 5 wherein said tape guide unit further includes means for rotationally driving said guide roller in response to relative rotation of said hub and housing in a first direction to unwrap said tape member from said hub coil and to wrap said tape member on said rim coil, whereby said guide roller revolves about said rotary hub in rolling contact with said rim coil.

7. The rotary joint of claim 6 wherein said means for rotationally driving said guide roller drives said guide roller at a speed to wrap said tape member on said rim coil faster than said tape member is unwrapped from said hub coil, in response to relative rotation of said hub and housing in said first direction, and further wherein said tape guide unit includes means for intermittently stopping revolution of said guide roller about said hub while continuing relative rotation of said hub and housing in said first direction.

8. The rotary joint of claim 7 wherein said means for intermittently stopping revolution of said guide roller comprises means responsive to the length of said tape member constituting said reverse bend for stopping revolution of said guide roller when said length reaches a predetermined minimum.

9. The rotary joint of claim 6 wherein said tape guide unit further includes means for allowing free-wheel rotation of said guide roller in response to relative rotation of said hub and housing in a second direction opposite to said first direction, to unwrap said tape member from said rim coil and to wrap said tape member onto said hub coil.

10. A rotary joint, comprising:

a housing defining a chamber bounded by a generally annular rim;

a rotary hub within said housing in radially spaced relation to and generally coaxial with said rim, said hub being adapted for rotation relative to said housing;

an elongated flexible tape for transmitting optic signals extending between said rotary hub and said rim, said tape being coiled about said hub to define a hub coil and said tape being coiled within said rim to define a rim coil, said tape further defining a segment extending between said hub coil and said rim coil; and a tape guide unit including means for shaping and maintaining said segment in the configuration of a reverse bend, whereby said tape is transferred from said hub coil to said rim coil in response to rotational driving of said hub in a first direction, and whereby said tape is transferred from said rim coil to said hub coil in response to rotational driving of said hub in a second opposite direction;

said tape guide unit including a guide roller in rolling contact with said tape generally at the juncture between said rim coil and said reverse bend segment, said guide roller being mounted on a carrier adapted for revolving about said hub and within said housing.

11. The rotary joint of claim 10 wherein said tape comprises a fiber optic tape.

12. The rotary joint of claim 10 wherein said tape drive unit includes spring means for urging said guide roller with a predetermined spring force into rolling contact with said rim coil.

13. The rotary joint of claim 12 wherein said tape guide unit includes drive means coupled between said hub and said guide roller for rotationally driving said guide roller when said hub is rotationally driven in a first direction to transfer tape from said hub coil to said rim coil, whereby said guide roller and said carrier revolve about said hub with said drive roller in rolling contact with said rim coil to wrap tape on said rim coil in a substantially slack-free manner.

14. The rotary joint of claim 13 wherein said drive means includes means for driving said guide roller at a speed to wrap tape on said rim coil faster than tape is unwrapped from said hub coil, when said hub is driven in said first direction, said tape guide unit further including means for intermittently stopping revolution of said guide roller about said hub.

15. The rotary joint of claim 14 wherein said means for intermittently stopping revolution of said guide roller comprises a tension roller in rolling contact with the tape at a position between said guide roller and said hub coil, said tension roller being carried on a tension arm mounted on said carrier for pivoting movement to displace said tension roller toward and away from said drive roller, and a tension spring for biasing said tension arm to urge said tension roller away from said guide roller, whereby said tension roller is drawn toward said guide roller in response to tape wrapping on said rim coil faster than tape unwrapping from said hub coil, said guide unit further including a stop member mounted on said carrier and movably operated by said tension arm when said tension roller reaches a predetermined position proximate to said guide roller to engage a ratchet surface mounted in a fixed position relative to said housing to stop revolution of said carrier and said guide roller about said hub.

16. The rotary joint of claim 15 wherein said tape guide unit further includes means for allowing free-wheel rotation of said guide roller when said rotary hub is driven in a second direction opposite to said first direction, to unwrap said tape from said rim coil and to wrap said tape onto said hub coil.

17. A method of providing optical communication across a rotary-stationary interface, comprising the steps of:

connecting an elongated flexible fiber optic tape between a rotary hub and a generally cylindrical rim disposed generally concentrically about said hub;

wrapping the tape about the hub to define a hub coil;

wrapping the tape within the rim to define a rim coil;

orienting a segment of the tape extending between the hub coil and the rim coil to define a reverse bend;

rotating the hub back and forth in opposite directions to transfer tape between the hub coil and the rim coil while maintaining the reverse bend; and connecting opposite ends of the tape at said hub and rim, respectively, to a pair of fiber optic cables.

* * * * *